E. G. ADAMS.
VEHICLE PROPELLERS.

No. 195,553.  Patented Sept. 25, 1877.

WITNESSES:
A. W. Almquist
J. H. Scarborough

INVENTOR:
E. G. Adams.
BY
[signature]
ATTORNEYS.

N. PETERS, PHOTO-LITHOGRAPHER, WASHINGTON, D. C.

UNITED STATES PATENT OFFICE.

EDWIN G. ADAMS, OF COHOES, NEW YORK.

IMPROVEMENT IN VEHICLE-PROPELLERS.

Specification forming part of Letters Patent No. 195,553, dated September 25, 1877; application filed March 24, 1877.

*To all whom it may concern:*

Figure 1:
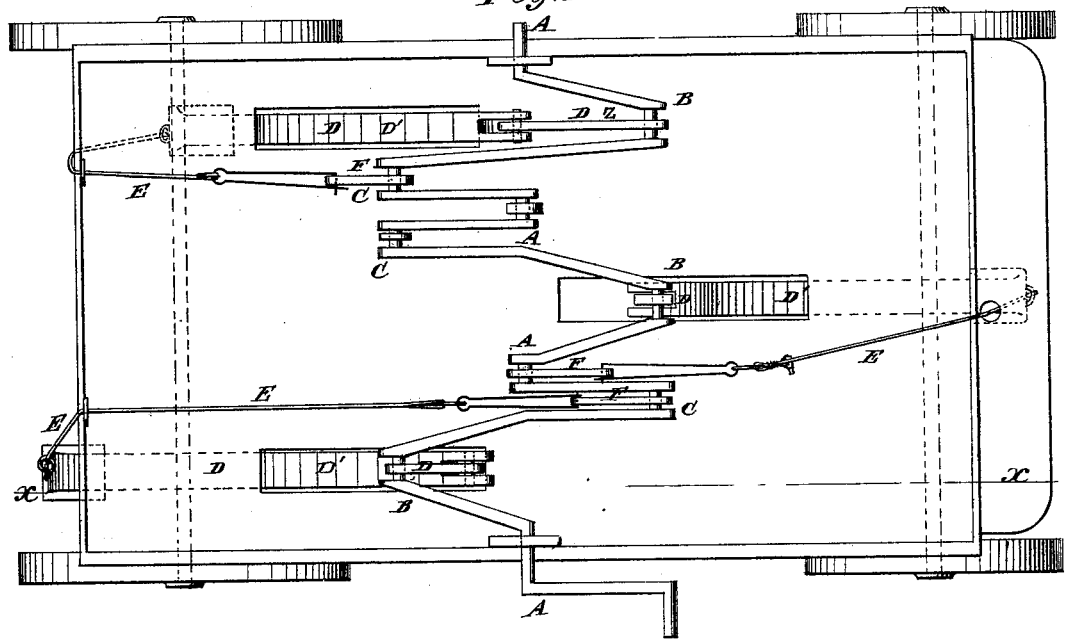
Figure 2:
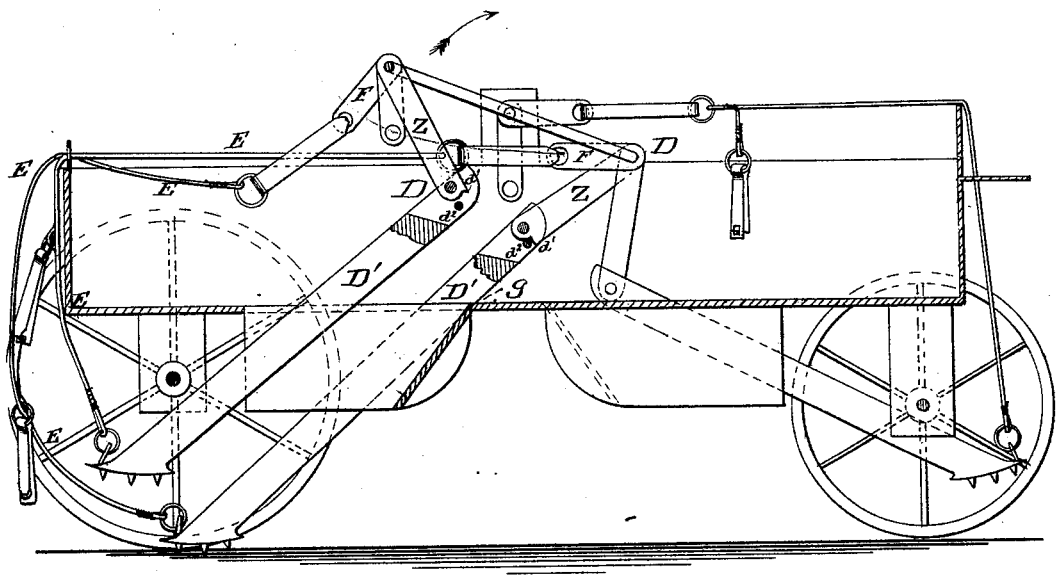

Be it known that I, EDWIN G. ADAMS, of Cohoes, in the county of Albany and State of New York, have invented a new and useful Improvement in Propelling Apparatus for Street-Cars, &c., of which the following is a specification:

Figure 1 is a top view of my improved apparatus, shown as applied to a car. Fig. 2 is a vertical longitudinal section of the same taken through the line $x\ x$, Fig. 1.

Similar letters of reference indicate corresponding parts.

The object of this invention is to furnish an improved apparatus for propelling street-cars, wagons, and other vehicles, canal-boats, and other vessels, which shall be simple in construction and effective in operation.

This invention has relation to vehicle-propellers which operate by the impact and direct pressure of the propelling-levers against the ground; and it consists in the construction and novel arrangement of the jointed levers pivoted to the cranks of the driving-axle, the guides, and the lifting-cords connected to said levers, all as hereinafter shown and described.

A represents a shaft, to which motion is given by steam or other convenient power. Upon the shaft A are formed a number of pairs of cranks, B C, the cranks of each pair projecting upon the opposite sides of the shaft, and the pairs projecting at different angles.

To the cranks B are pivoted the ends of a number of jointed levers, D, the other ends of which are designed to come in contact with the ground and push the vehicle forward.

Each jointed lever D consists of an upper portion, Z, pivoted to the crank, and a lower portion, D′, pivoted to the lower end of the upper portion, and swinging thereon when the lever is raised.

Upon the lower end of the upper part Z of the jointed levers D is formed a heel or shoulder, $d^1$, which, when the parts of said levers have moved a little past a straight line, strikes against a pin, $d^2$, passed through the other part D′, as shown in Fig. 2, to prevent the joint from turning back too far, and thus breaking the apparatus.

The lower ends of the levers D′ are rounded off, and have points or spikes formed upon or attached to them, or to shoes secured to them, to prevent said ends from slipping upon the ground.

The bed of the vehicle is provided with guides $g$, along which the levers D slide in their downward movement, and by which the jointed portions of said levers are brought up to the work, and stiffened as the feet reach the ground.

With this construction, as the crank-shaft A is revolved the lower ends of the jointed levers D alternately come in contact with the ground like the feet of a horse in walking, and push the vehicle forward with a continuous movement, one or another of the said levers being all the time pushing against the ground. As the levers D are lowered to the ground the toe or forward end of their feet first touch and operate upon the ground, then the middle part, and lastly the heel, as they rise from the ground.

E are cords, the lower ends of which are attached to the lower ends of the jointed levers D. The cords E pass over guide pulleys or slides, and their other ends are connected with the opposite crank C of each pair, or with a short bar, F, pivoted to said crank. With this construction, as the levers D come to the end of their stroke the cords E raise and support their lower ends as they are carried forward, and prevent them from dragging along the ground. Their upper ends during this movement hang from the upper joints Z.

By connecting the cords E with the shaft A, or with bars pivoted to said shaft, the levers D will be prevented from touching the ground. The same effect may be produced by attaching the cords to some stationary support.

One or more of the jointed levers D are turned forward, to be used by reversing the movement of the shaft A, for backing the vehicle.

Having thus described my invention, I claim as new and desire to secure by Letters Patent—

1. The jointed propelling-levers D, consisting of the upper portions Z, having shoulders $d^1$, pivoted to the cranks of the driving-axle, and the lower portions D' pivoted to said upper portions in connection with the lifting-cords E, attached to the ground ends of said lower portions, substantially as specified.

2. The combination of the heel or shoulder $d^1$ and the pin $d^2$ with the adjacent ends of the parts of the jointed levers D, substantially as herein shown and described.

3. The combination, in a vehicle-propeller, with the jointed levers D' Z and driving-cranks B C, of the guides $g$, against which the levers move in their descent, substantially as specified.

EDWIN G. ADAMS.

Witnesses:
JAMES T. GRAHAM,
C. SEDGWICK.